(12) United States Patent
Starner

(10) Patent No.: US 6,969,466 B1
(45) Date of Patent: Nov. 29, 2005

(54) PURIFICATION OF AMMONIA

(75) Inventor: Thomas C. Starner, Nazareth, PA (US)

(73) Assignee: Puritan Products, Inc., Bethlehem, PA (US)

(*) Notice: Subject to any disclaimer, the term of this patent is extended or adjusted under 35 U.S.C. 154(b) by 0 days.

(21) Appl. No.: 10/329,017

(22) Filed: Dec. 24, 2002

(51) Int. Cl.⁷ .............................................. B01D 15/04
(52) U.S. Cl. ...................... 210/663; 210/669; 210/681; 210/683; 210/684; 210/685; 210/687; 210/688
(58) Field of Search ................................ 210/638, 651, 210/663, 669, 681, 683, 684, 685, 687, 688; 423/352, DIG. 14

(56) References Cited

U.S. PATENT DOCUMENTS

| | | | |
|---|---|---|---|
| 2,184,943 A * | 12/1939 | Pattock et al. ................ 423/24 |
| 4,263,145 A * | 4/1981 | Wirth, Jr. ..................... 210/675 |
| 5,242,468 A * | 9/1993 | Clark et al. ................. 29/25.01 |
| 5,496,778 A * | 3/1996 | Hoffman et al. ........... 29/25.01 |
| 5,746,993 A * | 5/1998 | Mullee ........................ 423/352 |
| 6,001,223 A * | 12/1999 | Hoffman et al. .............. 203/12 |
| 6,183,720 B1 * | 2/2001 | Laederich et al. ....... 423/658.5 |

* cited by examiner

Primary Examiner—Ivars C. Cintins

(57) ABSTRACT

Highly pure aqueous solution of ammonia, typically electronics grade for use in semiconductor manufacturing is prepared by passing a solution of ammonia through at least one cation exchange resin bed to remove substantially all of the cation contaminants; subsequently passing the cation exchange resin effluent through at least one anion exchange resin; and recovering an aqueous solution of ammonia product substantially free of ionic contaminants.

11 Claims, 1 Drawing Sheet

PURIFICATION OF AMMONIA

FIELD OF THE INVENTION

The present invention relates to a process for producing an ultrapure liquid product for the microelectronics industry. More particularly, there is provided a process for producing ultra-pure aqueous solutions of ammonia by means of ion exchange.

DESCRIPTION OF THE PRIOR ART

Ammonia is an important process chemical in integrated circuit semiconductor manufacturing. It is commonly used for the deposition of silicone nitride, and may also be used for the deposition and for the nitridations of other nitrides. Further, ammonia combined with aqueous hydrogen peroxide is used in a procedure for cleaning semiconductor wafers.

Ammonia in the form of ammonium hydroxide contains both solid and volatile impurities. Such non-volatile contaminants includes compounds of alkali and alkaline earth metals, transition metals (d-block elements) selected from carbonates, halides, phosphates and sulfates of three metals which are damaging to electronic components. Also ammonium complexes which form with transition metals and Group III must be excluded. While these contaminants are not inclusive of all of the possible compounds, however, those listed are of primary interest regarding the contaminants known to be harmful in the manufacture of semiconductors.

Ultra-high purity aqueous ammonium hydroxide, typically electronics grade is currently prepared in a batch process by injecting gaseous ammonia into a closed vessel containing deionized water and recirculated in a closed loop until the target concentration of about 29 weight percent ammonia in reached. The mixing operation generates an exothermic reaction (780 BTU/lb.). In industrial operations, this excess heat must be removed and this refigures the expense of one or more, high capacity heat exchange units. The heat exchange unit may pose a hazard in that the unit may leak coolant, a potential contaminant for the aqueous ammonia. A process of this type as described, is patented by Mueller in U.S. Pat. No. 5,746,993, which is herein incorporated by reference.

Other processes for producing ultra-high purity ammonia for the microelectronics industry are disclosed in the following patents and typically also involve injecting gaseous ammonia into high or ultra-high purity water.

U.S. Pat. No. 6,001,223 to Hoffman et al discloses a method for the preparation of ultra-high purity ammonia by, passing the ammonia vapor through a scrubber unit whereby the ammonia gas is contacted with an aqueous solution of ammonia in deionized water, thereby purifying the ammonia gas, recovering the purified ammonia gas and dissolving it in purified water.

U.S. Pat. No. 6,183,720 to Laederich et al discloses the production of ultra-pure liquid chemicals, such as aqueous ammonia. The process involves using anhydrous ammonia in liquid form so as to be able, by vaporizing the anhydrous ammonia to yield a gas, scrubbing the gas in at least two scrubbing columns and dissolving the purified gas in deionized ultra-pure water in a dissolution column, collecting and continuously recirculating the liquid at the bottom of the dissolution column which is enriched with purified ammonia gas, thereby forming a high purity aqueous ammonia solution and recovering the high purity product when the desired concentration is reached.

U.S. Pat. No. 4,263,145 to Wirth Jr. discloses that a conventional procedure for removing metal cations, particularly sodium cations from condensate water from a steam turbine in an electrical power production facility, which involves contacting the condensate with mixed ion exchange beds or separate ion exchange beds containing a strong base cation resin and a strong acid anion resin. The condensate also contains ammonium or amine cations which are removed in the process.

Wirth Jr. discloses and claims an improvement in the above process relating to the regeneration step to recover the ammonium or amine ions in the form of ammoniated water and to recirculate the ammoniated water to the power production facility. The crux of the Wirth Jr. patented method includes treatment of the exhausted cation exchange resin with an aqueous solution of an alkaline earth hydroxide or an aqueous solution of a salt of an alkaline earth metal. The cations of the alkaline earth compounds exchange the alkali metal and ammonium or amine cations at conditions sufficient to form an aqueous ammoniated solution of hydroxides of the alkali metal and ammonium or amine cations at conditions sufficient to form an aqueous ammoniated solution of hydroxides of the alkali metal and ammonia or amine. This resulting aqueous ammoniated solution is then passed through another cation exchange resin to remove the alkali metal cations from the solution and the treated aqueous ammoniated solution with substantially no alkali metal (less than 1 ppb) is recirculated to the power production facility.

The Wirth Jr. patent is not concerned with providing an ultra-high purity aqueous solution of ammonia suitable for use in the microelectronics and semi-conductor industries. The Wirth Jr. process focuses on the removal of only one alkali metal ion, i.e. sodium ion. The patent is not concerned in removing impurities including a wide spectrum of cations and anions which are detrimental to the electronics industry to provide highly purified ammonia for use in semiconductor manufacturing.

Clearly there is a need for a simplified, economical and reliable process for supplying ammonia at an ultra-high purity level which can meet the more recent rigid standards of the microelectronics industry. These standards are set out in Semiconductor Equipment and Materials International (SEMI, C 21-0699 pp 6& 7, 1978, 1999), 805 East Middlefield Road, Mountain View, Calif. 94043.

SUMMARY OF THE INVENTION

According to the present invention there is provided an ion exchange process for producing an electronic grade ultra-high purity aqueous solution of ammonia substantially free of ionic contaminants that are damaging to electronic components if present during the manufacturing process. The ultra-high purity product produced by the instant process is useful in a wide range of applications in the microelectronics field and particularly in the semiconductor industry. Metallic ion impurities are the main focus for removal from the aqueous solution of ammonia intended for use in the semiconductor industry. Cationic impurities that will be removed from the aqueous solution as a result of the instant processes include metal ions of Group I, through V of the Periodic Table, particularly Group II Transition metals (d-block elements). Also, of particular concern are cations of barium, calcium, magnesium, potassium and sodium.

Anionic contaminants that are removed in this process include carbonate ions, halide ions, phosphate ions, and sulfate ions of the metal contaminants. Also removed are aminated forms of the metals that form as a result of contact with ammonia. Such aminated forms include hydroxyl ammonia complexes with transition metals (d-block) and aluminum, e.g. $Al(NH_4)_4^+OH^-$.

In its broadest aspect the present invention there is provided a process for producing an ultra-high purity aqueous solution of ammonia substantially free of ionic contaminants comprising the steps of:
a) passing an aqueous solution of ammonia through at least one cation resin bed for removing cations selected from the group consisting of alkali metals, alkaline earth metals, Group II transitional metals (d-block), Group III metals, Group IV metals, Group V metals from said aqueous solutions:
b) subsequently passing the resulting aqueous solution of ammonia through at least one anion exchange resin bed for removing anions selected from carbonate ions, halide ions, hydride ions, phosphate ions, sulfate ions, and hydroxyl ammonia ion complexes with aluminum and transition metals (d-block) from said aqueous solution; and
c) recovering an aqueous solution of ammonia substantially free of anionic and cationic contaminants.

The aqueous solution of ammonia may require several passes through single cation and anion exchange units as shown in FIG. 1 before acceptable SEMI standards are obtained. Recycling and continuous circulation in this system requires a mere manipulation of valves to form a continuous loop. Optionally the process may employ a plurality of cation and anion exchange units, each connected in a series to reduce the process time and regeneration requirements. The flow rate through the ion exchange is critical to achieve the desired purity.

It is, therefore, a primary object of the invention to provide ultra-pure aqueous solutions of ammonia substantially free of ionic contaminants which are detrimental in semiconductor manufacture.

Yet another object of this invention is to provide a process for purifying a technical grade aqueous solution that is operated at conditions which are efficient, simple to operate and monitor, generates no appreciable exothermic or emissions, thus having essentially no adverse impact on the environment.

These and other object features and advantages will become apparent from the following description of the preferred embodiments, claims and accompanying drawings.

DETAILED DESCRIPTION OF THE PREFERRED EMBODIMENTS

Figure 1:
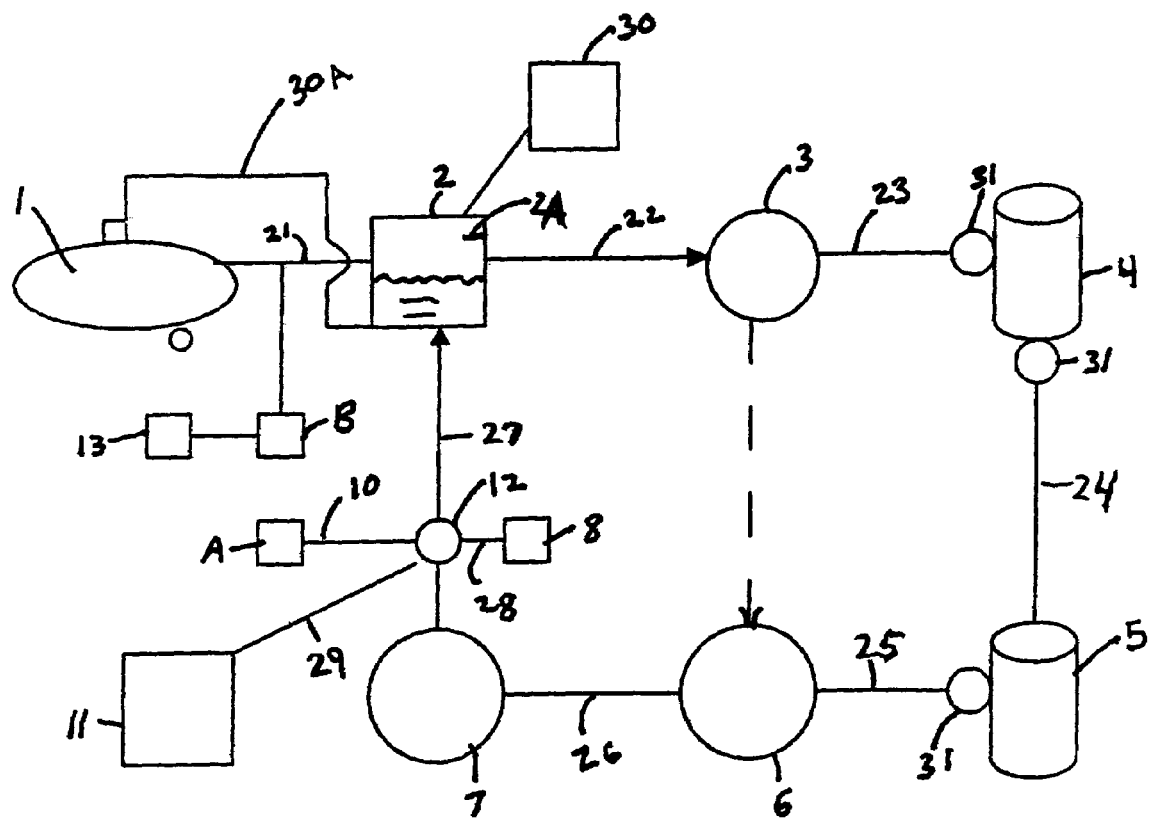
FIG. 1 is a flow diagram of a process for producing an ultra-high purity aqueous solution of ammonia substantially free of ionic contaminants.

In accordance with this invention commercial grade aqueous solutions of ammonia, which contain ionic contaminants, particularly those anions and cations which are detrimental in the manufacture of micro-electronic components, are purified by means of sequential cation-anion resin exchange contact. The concentration and content of these impurities may vary widely depending on the source and how the solutions are stored and handled. All such impurities or contaminants must be substantially removed before the aqueous solution of ammonia can be used in electronic component production lines.

Referring to FIG. 1, a tank trailer provides an aqueous solution of a technical grade aqueous solution of ammonia having a concentration ranging from about 25 to 30 weight percent. The technical grade aqueous solution is sampled at stations B taken off line 21. An analysis is conducted using an axial view inductively coupled plasma spectrometer (ICP) 13. The technical grade aqueous solution after sampling is passed into a flexible-walled plastic process feed tank 2. The process feed tank 2 is preferably constructed of or lined with high density polyethylene (HDPE) since it has been found that this plastic is less reactive with aqueous ammonia solutions than fluorocarbon plastics. The size of the process feed tank 2 should correspond to at least twenty-five percent over the supply reservoir capacity. The process of the invention can be carried out on a large industrial scale. The process feed tank 2 size is generally in the range of about 5,000 to 10,000 gallons. The process feed tank 2 may optionally be provided with a level sensor 2A forming part of an automated control system 30A that electronically monitors the levels and rates of flow throughout the purification system. Upon detection of a high level of liquid in any filter tank or ion exchange column, the automated system 30A which comprises a programmable logic controller can fully or partially close the necessary valves 31 and pumps in order to slow or stop the liquid in any part of the system.

The overall process of this invention is typically conducted at ambient temperatures with temperatures ranging from about 32° F. to 75° F. being especially preferred. Since no heat of dilution occurs as it does in the conventional anhydrous ammonia process, described above, little or no exotherm is generated in the present processes because the ammonia is already dissolved in the aqueous solution. Only a small amount of heat exchange may be necessary to be used in the summer months to lower the ammonia solution vapor pressure while the solution is being recirculated through the ion exchange resin beds when the ambient temperature exceeds 80° F. In this case at system start-up, all cooling systems are turned on and allowed to achieve maximum effectiveness and operational capacity before initiating the actual purification process. Optimum ion exchange occurs when the system flow rate is 35 to 50 GPM (Gallons Per Minute). The time necessary to affect efficient ion exchange is equal to one minute for every 20 gallons of fluid to be processed.

In the flow diagrams of FIG. 1, the aqueous solution of ammonia is drawn from tank trailer 1 (after the sample is taken) and is passed to process feed tank 2 through lines 21. After leaving the process feed tank 2 through line 22, the aqueous solution of ammonia is passed through a filtration unit 3 having the capability of removing any solid matter 1 micron or larger suspended in the liquid. The filtered solution is transferred through line 23 and passed through at least one strong acid cation exchange resin bed 4. An auxiliary resin bed 4 is used to have a continuous process in the event of early contamination. It is essential that the cation exchange resin in bed 4 is pretreated with a diluted solution of an inorganic acid such as hydrochloric acid or sulfuric acid using conventional pretreatment techniques so that all the acid groups are in the protonate or H+ form. The eluting and desorption procedure is continued to ensure that all of the metallic cations that may be present are extracted from the resin bed. As the aqueous solution of ammonium containing metal contaminants passes through the cation resin, hydrogen ions on the resin are exchanged by the metal ions of the contaminants. As a consequence, metal cations including alkali metals, sodium and potassium; alkaline earth metals, barium, calcium and magnesium; Group II, chromium, copper, gold, iron, manganese, nickel, tin, and zinc; Group III, aluminum, and boron; Group IV, tin and lead; and Group V, antimony, and arsenic are extracted. The cation-depleted solution of ammonium is passed through line 24 to strong base exchange resin bed 5, which may also comprise an auxiliary bed 5.

The strong base anion exchange resin is pretreated typically with deionized water or regenerated with a non-metal amino or hydroxide solution to remove any undesirable anions which may be present on the resin that can contaminate the aqueous solution of ammonia. Furthermore, this provides the active sites of the resin in the OH– form. As the aqueous solution of ammonia containing anionic contaminants selected from the anionic groups of halides particularly chlorides, carbonates, oxides, phosphates, and sulfates passes through the strong base anion exchange resin, these anions are exchanged with the hydroxide anion on the resin. Also removed from the treated solution by the strong base anion resin are ammonia hydroxyl complexes that form as a result of contact with ammonia, e.g $[AL(NH_4)_4{}^+OH^-]$ and metallic anions such as $FeCl_6$.

After leaving the anion exchange bed 5 the aqueous solution is transferred by line 25 to a microfiltration unit prefilter 6 (0.5 microns) and then passed through line 26 to a final filter consisting of an ultrafiltration membrane unit 7 (0.1 microns).

Optionally, other filtration or filtration stages can be considered with the disclosed purification apparatus. Microfiltration and ultrafiltration units and membranes are commercially available and can be used.

As the aqueous solution of ammonia exits from the final filter 7 it is sampled at station A. The concentration of the ionic contaminants is analyzed by an ICP (typically cationic contaminants), the remaining anion impurities are determined by a wet chemical process. If purity is not up to the standard desired, the aqueous solution is passed through valve 12 and line 27 back to process feed tank 2 and recycled continuously through the system until the desired purity is reached. At this point the treated aqueous solution substantially free of ionic contaminants may be directed to several alternate routes. The aqueous solution may be returned to the tank trailer from process feed tank 2 through transfer line 30, or may be packaged into drums 8 through line 28 or into storage tank 11 through line 29.

As note above, one of the primary embodiments of this invention is to provide high purity aqueous solutions of ammonia for users who are limited in size and/or cannot store large quantities of this chemical on site because facilities to control the emissions within the standards set by the Environmental Protection Agency are not available at the job site.

The process described may be operated in either a batch-wise semi-continuous or continuous mode. For example, the process of the invention can be integrated into a production line of a semiconductor manufacturing operation without packaging or transport. The continuous system of the invention prepares the ultra-pure aqueous ammonia immediately prior to use.

Any cation exchange material which can be placed in the proton or hydrogen ion cycle and maintained therein and is capable of removing the desired cationic metal impurities without reducing the concentration of ammonia in the aqueous solution is useful. All types of cation exchange resins are suitable e.g. sulfonic, phosphoric, or carboxylic resins. The cation resin may be employed in both the macroporous or gel forms. Preferably, the cation exchange resin may be employed in the process in the form of a dense compact fixed bed which is alternatively contacted with the feed mixture and desorbent materials. In the simplest embodiment, the cation exchange resin is used the form of a single static bed in a semi-continuous process. In another embodiment two or more, and preferably four static cation exchange beds are used with the proper valving that the feed solution may be passed through one or more remaining static beds. The flows of the feed solution which is critical may be up or down through the resin bed. Furthermore, any conventional apparatus employed in static bed fluid-solid contacting may be used in the practice of this invention.

Strong acid cation exchange resins are preferred and include: Purolite CT-151, C-100, C-150, C-105, and NPW-100, IR-120, IR-122, IR-200, DP-1, and IRC-50 manufactured by Rohn & Haas, Philadelphia, Pa.; Dow MSC-1, Dowex C-200, C-26, C-280 marketed by the Dow Chemical Company, Midland, Mich., Duolite A-109 available from Chemical Process, Redwood City, Calif., and the like in the $H^+$ form. Preferably the cation resin is a strong acid cation exchange resin of a sulfonated copolymer of a monovinylidene aromatic most preferably styrene and a polyvinulidene aromatic preferably divinylbenzene, which cation resin in the $H^+$ form is capable of reducing the cation concentration without substantially reducing the concentration of ammonia in the aqueous solution.

Any anion exchange material which can be placed in the hydroxide ion OH– cycle and maintained therein and is capable of removing the desired anion contaminants are useful and may be employed in this invention. Strong base anion exchange resins which are preferred and which may be utilized in the present invention include: Purolite A-600, A-400, A-300, A-850, and A-87 (Chemical Process); Amberlite IRA-400, IRA-402, IRA- 904, and IRA-93 (Rohn & Haas); Dowex II (Dow Chemical); Ionac ASB-1 Sybron Chemicals, Duolite A-109 (Chemical Process) and the like. Preferably, the anion exchange resin is a strong base anion exchange resin ASB-1P(OH), Sybron Chemicals, Birmingham, N.J.

As mentioned earlier in this disclosure no exothermic reaction is involved in the process, however, the volatility of ammonia in aqueous solutions, especially at concentrations above 25 weight percent makes temperature an important operating parameter. For example, a 29 weight percent ammonia aqueous solution will boil at 85° F. The process of the invention is usually conducted at ambient temperature, but may be run at temperatures ranging from about 32° F. to about 75° F. and preferably from about 68° F. to about 73° F.

Another important operating parameter is the volumetric processing rate of the ammonia solution which should be controlled to provide for a high degree of contact between the liquid and resin bed. This flow rate should be in the range of about 35 to 50 gpm (gallons per minute) and preferably operated at about 45 gpm. A programmed flow controller may be provided to set out and regulate the flow rate.

To further illustrate this invention the following example is provided without any intention of being limited thereby. All parts and percentages are by weight unless otherwise specified.

EXAMPLE 1

This example involves a preferred embodiment of producing an ultra-high purity, electronics grade aqueous solution of ammonia substantially free of contaminants by purifying a technical grade aqueous ammonia solution. The process follows the flow diagrams of FIG. 1. Seven runs were conducted on an industrial scale and operating parameters were as follows:

| | |
|---|---|
| Temperature of the solution before treatment | 68°–73° F. |
| Flow Rate (gpm) | 35–50 |
| Processing Time | 5 hours |
| Temperature of solution after treatment | 69°–72° F. |

Prior to introducing the aqueous ammonia solution into the plant system, a sample of the solution was taken at station B from reservoir 1 (tank trailer) containing 6000 gallons (45,000 lbs) and analyzed for the ammonia concentration as well as quantitatively for ionic contaminants. The total ionic contamination included 38.75 ppm, 3.75 ppm (3750 ppb) cationic contaminants and 35 ppm anionic contaminants. The aqueous ammonia solution is transferred to a 7500 gallon HDPE process feed tank 2. From the process feed tank 2 the process stream passes through bag filter 3 containing one 7" dia×30" long (1.0 micron) bag then to cation exchange unit 4.

The cation exchange unit 4 consisted of a uniformly packed bed in a single column loaded with Sybron Ionac Cation Resin C267(H+) at a depth of 48" or 20 cu ft. The cationic resin was properly conditioned and penetrated to be in a proton cycle, preferably in a hydrogen cycle (H+) form and was tested by ICP means to ensure that substantially all the metal cations were removed from the reactive sites to ensure a more efficient removal of the intended undesirable cationic contaminants.

The cation exchange unit effluent was then transferred to anion exchange unit 5 which consisted of a uniformly packed bed in a single column containing Sybron Ionac Strong Base Anion Resin ASB-1P(OH) at a depth of 48" or 20 cu ft. The anion exchange unit effluent passed through a prefilter unit consisting of a microfilter element 3×40" (0.5 microns). The aqueous product stream existing the final filter unit 7 was diverted by valve 12 to any one of storage tank 1 through line 29, packaging 8 through line 28 and line 10 to be monitored at fixed time intervals e.g. 30 minutes at station A. The products stream after monitoring was recycled through line 27 to process feed tank 2 and recirculation through the system for 5 hours to yield a high purity electronics grade aqueous solution of ammonia substantially free of ionic contaminants. The temperature of the high-purity aqueous solution of ammonia after processing was 72° F. The reduction of trace metals is shown in the results of the ICP.

The cation exchange unit effluent was then transferred to anion exchange unit 5 which consisted of a uniformly packed bed in a single column containing Sybron Ionac Strong Base Anion Resin ASB-1P(OH) at a depth of 48" or 20 cu ft. The anion exchange unit effluent passed through a prefilter unit consisting of a microfilter element 3×40" (0.5 microns) and then through a final filter unit 7 containing an ultrafiltration membrane 3×40" (0.1 microns). The aqueous product stream existing the final filter unit 7 was diverted by valve 12 to any one of storage tank 11 through line 29, packaging 8 through line 28 and line 10 to be monitored at fixed time intervals e.g. 30 minutes at Station A. The products stream was recycled through line 27 to process feed tank 2 and recirculation through the system for 5 hours to yield a high purity electronics grade aqueous solution of ammonia substantially free of ionic contaminants. The temperature of the high-purity aqueous solution of ammonia after processing was 72° F. The reduction of trace metals is shown in the results of the ICP.

The term "substantially free" as used herein refers to a purified aqueous solution of ammonia that has less than 500 ppb or less of cationic contaminants and less than 25 ppm of total ionic contaminants including cationic and anionic contaminants.

While the present example is limited to a single cation exchange column and a single anion exchange unit, a sufficient number of prepared ion exchange units may connect in a series so that the required quality of the aqueous solution of ammonia can be obtained with reduced treatment time and without frequent regeneration.

Upon exhaustion of the cation exchange resin in column 4 e.g. the cation exchange resin can no longer reduce the metal contaminants to acceptable levels, the cation resin can be regenerated using regenerants such as sulfuric or hydrochloric acid in a conventional manner well known in the art for regenerating cation exchange resins. Similarly, upon exhaustion of the anion resin in the anion column 5, the anion resin can be regenerated with a regenerant such as sodium hydroxide using conventional techniques for regenerating anion exchange resins.

While in the foregoing specification this invention has been described in relation to specific embodiments thereof and many details have been set forth for the purpose of illustration, it will be apparent to those skilled in the art that the invention is susceptible to additional embodiments and that many of the details set forth herein can be varied considerably by those skilled in the art without departing from the basic principles of the invention.

What is claimed is:

1. A process for purifying an aqueous feed solution of ammonia containing cationic and anionic contaminants comprising the steps of:
   a) passing said aqueous feed solution of ammonia through at least one cation exchange resin bed so as to remove substantially all of the cationic contaminants at a flow rate of 35 to 50 gpm,
   b) subsequently passing the resulting aqueous solution through at least one anion exchange resin bed so as to remove substantially all of the anionic contaminants at a flow rate of 35 to 50 gpm; and
   c) recovering an aqueous solution of ammonia product substantially free of ionic contaminants.

2. The process of claim 1 wherein said aqueous solution of ammonia in step a) is passed through a plurality of cation exchange resin beds.

3. The process of claim 1 wherein said aqueous solution of ammonia in step b) is passed through a plurality of anion exchange resin beds.

4. The process of claim 1 including filtering said feed solution.

5. The process of claim 1 wherein the cationic contaminants are selected from alkali metal, alkaline earth metals, Group II metals, Group III metals, Group IV metals and Group V metals.

6. The process of claim 5 wherein the alkali metals are potassium and sodium and the alkaline earth metals are barium, calcium or magnesium.

7. The process of claim 1 wherein the removed anionic contaminants are selected from the group consisting of halide ions, sulfate ions, phosphate ions, and metallic anion complexes formed with Group II metals and ammonium hydroxyl complexes with Group III metals.

8. The process of claim 7 wherein the anionic contaminants are metallic anion complexes of the formula [(AL(NH$_4$)$_4$+OH−] and FeCl$_6$-ion.

9. The process of claim 1 wherein the process is conducted in a single pass mode.

10. The process of claim 1 wherein said aqueous solution of ammonia is partially depleted of ionic contaminants after step a) and continuously recirculating the partially depleted solution through step a) and step b) until the partially depleted solution is substantially free of ionic contaminants.

11. The process of claim 1 in which steps a) and b) are conducted at a temperature from about 32° F. to about 75° F.

* * * * *